US012722170B2

(12) United States Patent
Sasa et al.

(10) Patent No.: US 12,722,170 B2
(45) Date of Patent: Sep. 1, 2026

(54) BATH DEVICE, APPARATUS AND SYSTEM FOR SUPPLYING LIQUID

(71) Applicant: Samsung Electronics Co., Ltd., Suwon-si (KR)

(72) Inventors: Takashi Sasa, Suwon-si (KR); Junhee Lee, Suwon-si (KR); Hokyun Kim, Suwon-si (KR); Kyoungwhan Oh, Suwon-si (KR); Yohan Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 18/802,238

(22) Filed: Aug. 13, 2024

(65) Prior Publication Data

US 2025/0242364 A1 Jul. 31, 2025

(30) Foreign Application Priority Data

Jan. 31, 2024 (KR) ........................ 10-2024-0015055

(51) Int. Cl.
*B05B 9/04* (2006.01)

(52) U.S. Cl.
CPC .................................. *B05B 9/0403* (2013.01)

(58) Field of Classification Search
CPC ..... B05B 9/0403; B05C 11/1002; F16K 7/00; G03F 7/162; H10P 72/0448
See application file for complete search history.

(56) References Cited

U.S. PATENT DOCUMENTS

| | | | | |
|---|---|---|---|---|
| 9,162,163 | B2 * | 10/2015 | Yoshida | B01D 19/0036 |
| 2014/0097147 | A1 * | 4/2014 | Yoshida | B01D 19/0036 210/141 |
| 2018/0074407 | A1 | 3/2018 | Yoshihara et al. | |
| 2019/0063415 | A1 * | 2/2019 | Nishimura | F04B 43/02 |
| 2020/0348596 | A1 * | 11/2020 | Carcasi | G03F 7/16 |
| 2022/0187721 | A1 | 6/2022 | Sasa et al. | |
| 2023/0158526 | A1 * | 5/2023 | Fujimoto | B05B 9/0409 239/320 |
| 2025/0242364 | A1 * | 7/2025 | Sasa | B05B 9/0403 |

FOREIGN PATENT DOCUMENTS

| | | | | |
|---|---|---|---|---|
| KR | 10-2006-0020138 A | | 3/2006 | |
| KR | 10-0664779 B1 | | 1/2007 | |
| KR | 10-0809219 B1 | | 2/2008 | |
| KR | 10-1096847 B1 | | 12/2011 | |
| KR | 20130051245 A | * | 5/2013 | B05C 5/0225 |
| KR | 10-2091984 B1 | | 3/2020 | |
| KR | 10-2022-0085075 A | | 6/2022 | |
| KR | 20240135098 A | * | 9/2024 | B05C 5/001 |

* cited by examiner

*Primary Examiner* — Bob Zadeh
(74) *Attorney, Agent, or Firm* — Muir Patent Law, PLLC

(57) ABSTRACT

A liquid supply bath device includes a main body including a flow passage having an inlet through which liquid flows in and an outlet through which the liquid flows out, an accommodation space in which the liquid is accommodated and of which an upper portion is opened to insert a discharge unit configured to discharge the liquid to a substrate, and a connection passage connected to the flow passage and the accommodation space. The liquid supply bath device further includes an opening/closing valve disposed on the main body and configured to open and close the connection passage.

18 Claims, 7 Drawing Sheets

BATH DEVICE, APPARATUS AND SYSTEM FOR SUPPLYING LIQUID

CROSS-REFERENCE TO RELATED APPLICATION(S)

This application claims the benefit of priority to Korean Patent Application No. 10-2024-0015055 filed on Jan. 31, 2024 in the Korean Intellectual Property Office, the disclosure of which is incorporated herein by reference in its entirety.

BACKGROUND

Aspects of the present inventive concept relate to a liquid supply bath device, a liquid supply apparatus, and a liquid supply system.

Generally, in order to manufacture a semiconductor device, multiple processes such as a deposition process, a photo process, an etching process, a cleaning process, etc. are required, and multiple devices are used. For example, in a photo process, etc., a liquid supply system may be used to supply various types of processing liquids to a substrate in a substrate processing facility such as a photo track (spinner) facility, etc. to proceed with a photo process. In this case, in order to transport liquid to the substrate, the liquid supply system may be equipped with various parts such as a pump, a valve, etc. In this case, particles may be generated during operations of these parts. For example, the liquid may stagnate in a pipe or a part, causing polymers to coagulate in the liquid, to generate particles. These particles may be a major cause of defects in the substrate during patterning of the photo process.

In order to reduce generation of such particles, in a conventional liquid supply system, during a standby period in which processing liquid is not supplied to a substrate from a nozzle unit connected to a liquid supply line, a dummy dispensing processing may be performed in which liquid is periodically discharged to the outside through the nozzle unit. When performing the dummy dispensing processing, since the nozzle unit should move to a home port, to discharge the liquid into the home port, there may be a problem of lowering productivity.

SUMMARY

An aspect of the present inventive concept is to provide a liquid supply bath device, a liquid supply apparatus, and a liquid supply system that may prevent the generation of particles by reducing stagnation of liquid.

According to an aspect of the present inventive concept, a liquid supply bath device includes a main body including a flow passage having an inlet through which liquid flows in and an outlet through which the liquid flows out, an accommodation space in which the liquid is accommodated and of which an upper portion is opened to insert a discharge unit configured to discharge the liquid to a substrate, and a connection passage connected to the flow passage and the accommodation space; and an opening/closing valve disposed on the main body and configured to open and close the connection passage.

According to an aspect of the present inventive concept, a liquid supply apparatus includes a liquid supply bath device including a main body including a flow passage having an inlet through which liquid flows in and an outlet through which the liquid flows out, an accommodation space of which an upper portion is opened and in which the liquid is accommodated, and a connection passage connected to the flow passage and the accommodation space; and an opening/closing valve disposed on the main body and configured to open and close the connection passage; and a discharge unit detachably inserted into the accommodation space, and configured to suck the liquid in the accommodation space and discharge the liquid to a substrate.

According to an aspect of the present inventive concept, a liquid supply system includes a supply tank connected to a liquid supply source; a liquid supply line connected to the supply tank and configured to transport a liquid flowing out from the supply tank; a circulation line in which a circulation opening/closing valve is disposed and configured to circulate the liquid supplied through the liquid supply line to the supply tank; a liquid supply bath device including a main body including a flow passage having an inlet connected to the liquid supply line and through which the liquid flows in and an outlet connected to the circulation line and through which the liquid flows out, an accommodation space of which an upper portion is opened and in which the liquid is accommodated, and a connection passage connected to the flow passage and the accommodation space, and an opening/closing valve disposed on the main body and configured to open and close the connection passage; and a discharge unit detachably inserted into the accommodation space, and configured to suck the liquid in the accommodation space and discharge the liquid to a substrate.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, preferred embodiments of the present inventive concept will be described with reference to the attached drawings.

Figure 1:
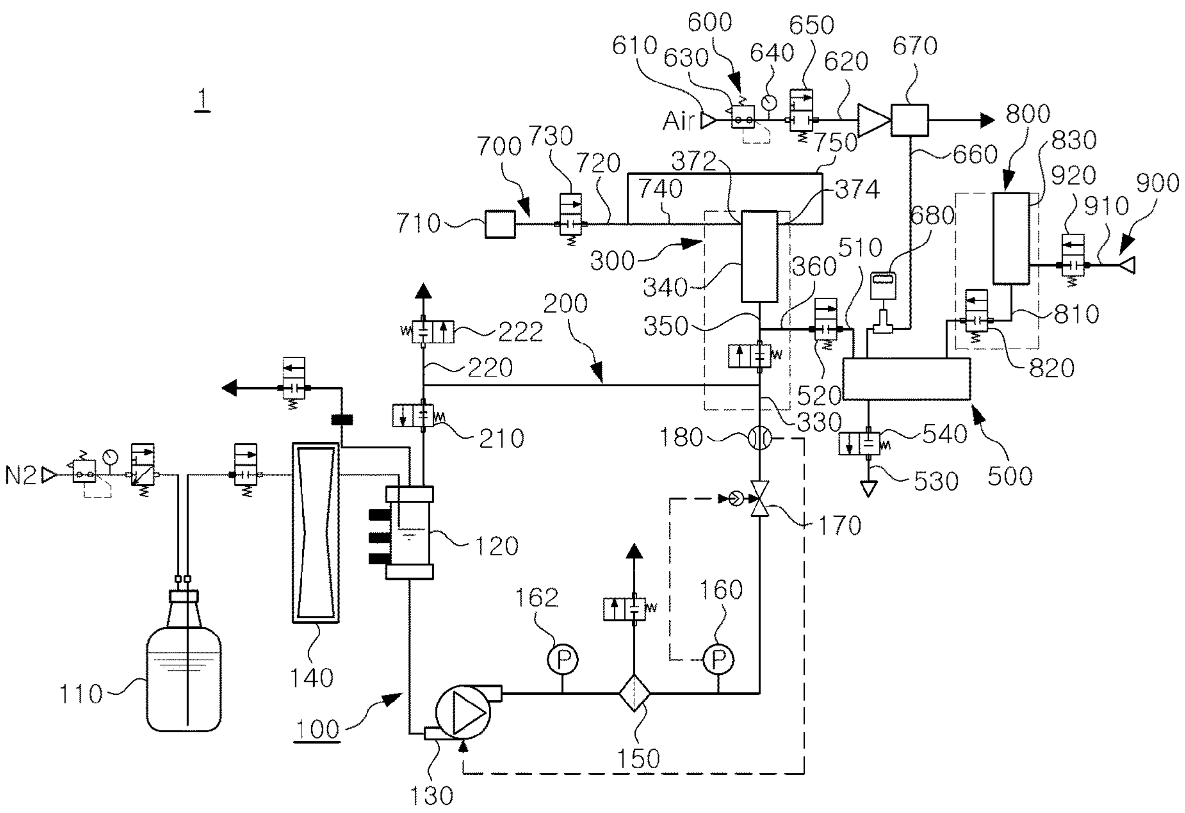
FIG. 1 is a view schematically illustrating a liquid supply system according to an example embodiment.
Figure 2:
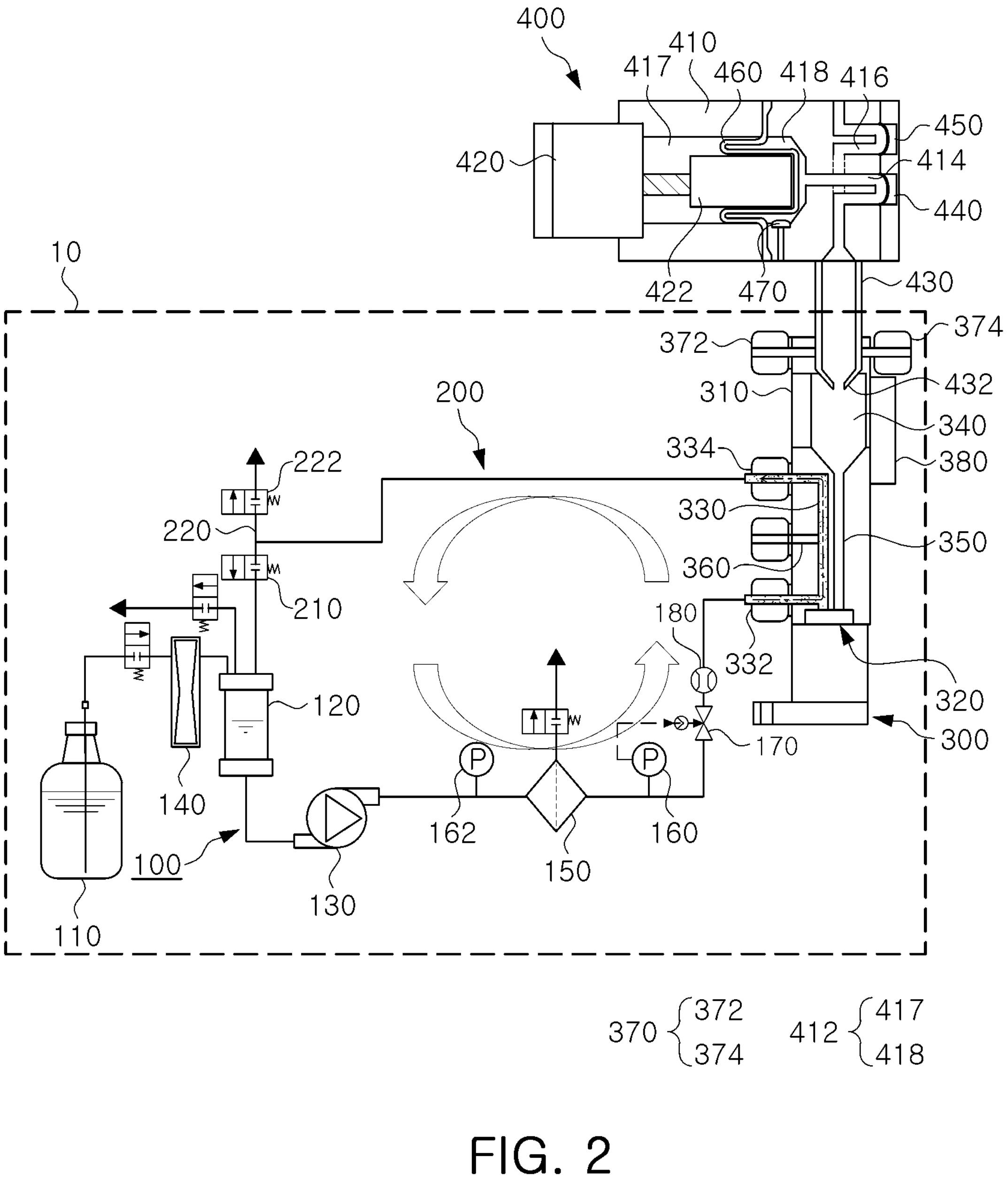
FIG. 2 is a view schematically illustrating a liquid supply apparatus of a liquid supply system according to an example embodiment.

FIG. 1 is a view schematically illustrating a liquid supply system according to an example embodiment, and FIG. 2 is a view schematically illustrating a liquid supply apparatus of a liquid supply system according to an example embodiment.

Referring to FIGS. 1 and 2, a liquid supply system 1 according to an example embodiment may include a liquid supply line 100, a circulation line 200, a liquid supply bath device 300 connecting between the liquid supply line 100 and the circulation line 200, and a discharge unit 400 discharging liquid in the liquid supply bath device 300 to a substrate.

The liquid supply system 1 may be a system supplying the liquid to the substrate in a substrate processing apparatus in which a photo process is performed. In an example embodiment, the liquid supply system 1 may supply resist liquid to the substrate.

One end of the liquid supply line 100 may be connected to a liquid supply source, and the other end of the liquid supply line 100 may be connected to an inlet 332 of a flow passage 330 of the liquid supply bath device 300, which will be described later. A supply tank 120 and a pump 130 may be disposed in the liquid supply line 100, and the liquid flowing out of the supply tank 120 may be pumped by the pump 130, and may be supplied to the liquid supply bath device 300. The liquid source may be a supply bottle 110, for example. $N_2$ gas may be supplied inside the supply bottle 110 to pressurize the liquid stored inside the supply bottle 110 and flow into the supply tank 120 through the liquid supply line 100. In addition, a pressure bezel 140 may be disposed in the liquid supply line 100 between the supply bottle 110 and the supply tank 120, and a filter 150 filtering the liquid may be disposed on a rear end of the supply tank 120 in a liquid supply direction. In an example embodiment, the filter 150 may be disposed in the liquid supply line 100 between the liquid supply bath device 300 and the pump 130 located on the rear end of the supply tank 120 in the liquid supply direction. The pressure bezel 140 may be formed of an elastic fluoropolymer, and an internal portion thereof may be formed as a flexible film and an external portion thereof may be formed as a hard film. The pressure bezel 140 may generate not only positive pressure but also negative pressure by supplying gas between the two films. For example, the pressure bezel 140 may generate negative pressure, and may flow liquid from which the gas has been removed through the supply tank 120 to the filter 150, to realize an efficient filter wetting effect. When supplying liquid to the supply tank 120, the liquid may not be directly pressurized within the supply bottle 110. However, the pressure bezel 140 may be used to indirectly pressurize the liquid, without gas inside the pressure bezel 140 directly contacting the liquid., Accordingly, the pressure bezel 140 may allow liquid within the supply bottle 110 to be supplied to the supply tank 120 with a reduced risk of gas being dissolved in the liquid.

One end of the circulation line 200 may be connected to an outlet 334 of the flow passage 330 of the liquid supply bath device 300, which will be described later, and the other end of the circulation line 200 may be connected to the supply tank 120. A circulation opening/closing valve 210 may be disposed in the circulation line 200, and the liquid supplied through the liquid supply line 100 may be circulated to the supply tank 120. For example, by an operation of the liquid supply bath device 300, liquid flowing into the liquid supply bath device 300 through the liquid supply line 100 may be supplied into the liquid supply bath device 300, or may be circulated back to the supply tank 120 through the circulation line 200, which will be described in detail below, selectively. Additionally, a discharge line 220 in which a discharge opening/closing valve 222 is disposed may be connected to the circulation line 200 to discharge the liquid externally.

The liquid supply bath device 300 and the discharge unit 400 may be configured as a liquid supply apparatus. For example, referring to FIG. 2, the liquid supply apparatus may include the liquid supply bath device 300 and the discharge unit 400, and the liquid may be supplied to the substrate by a cooperative operation of the liquid supply bath device 300 and the discharge unit 400.

Figure 3:
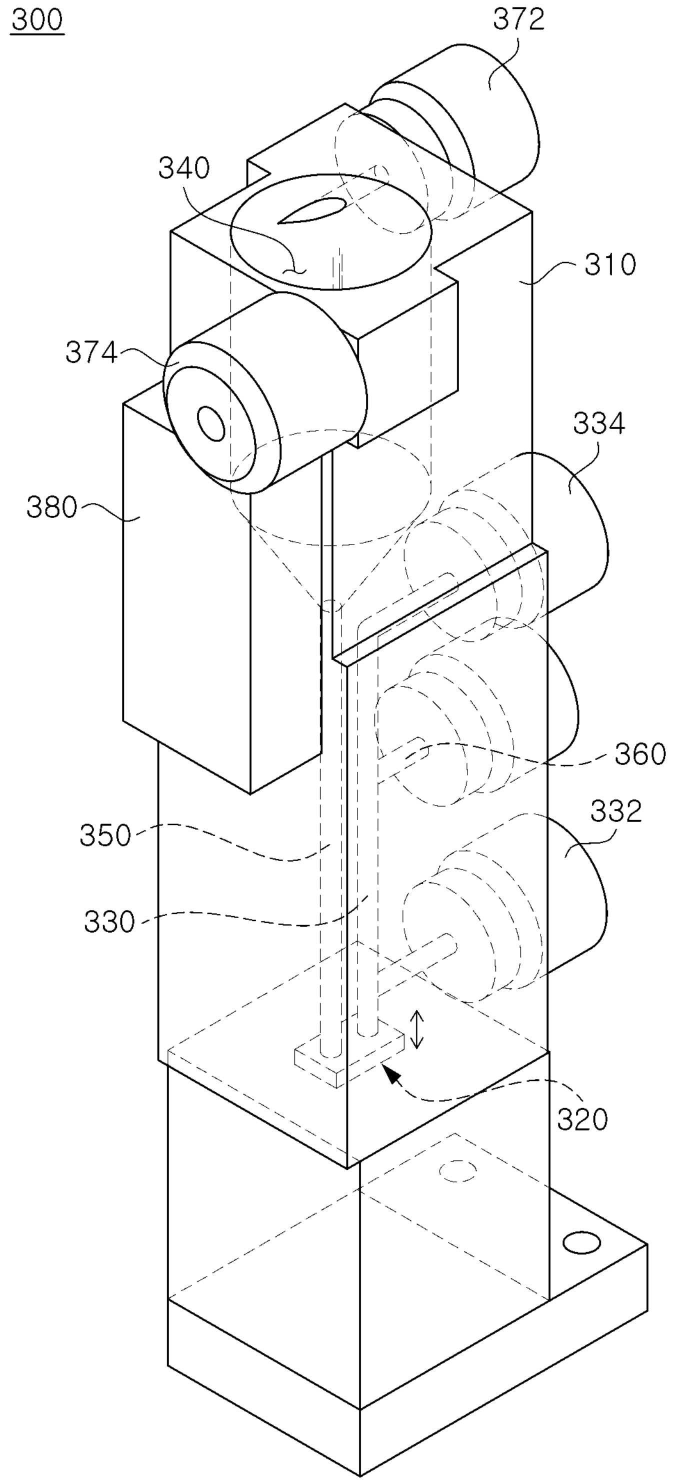
FIG. 3 is a view schematically illustrating a liquid supply bath device according to an example embodiment.
Figure 4:
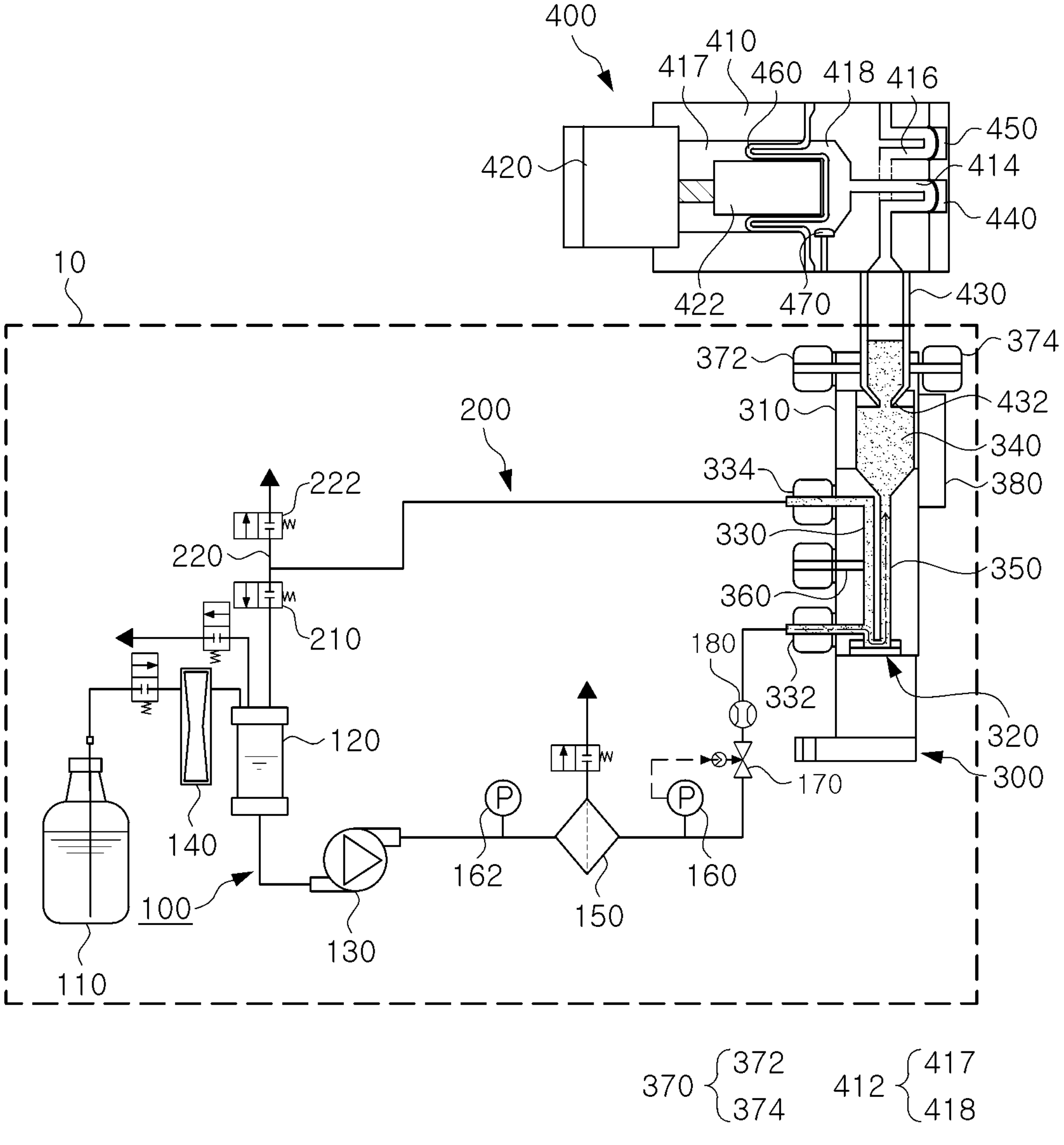
FIG. 4 is a view schematically illustrating a state in which liquid is supplied to an accommodation space of a liquid supply bath device in a liquid supply system according to an example embodiment.

FIG. 3 is a view schematically illustrating a liquid supply bath device according to an example embodiment, and FIG. 4 is a view schematically illustrating a state in which liquid is supplied to an accommodation space of a liquid supply bath device in a liquid supply system according to an example embodiment.

Referring to FIGS. 1 to 4, the liquid supply bath device 300 may include a main body 310 and an opening/closing valve 320 disposed on the main body 310. The main body 310 may include a flow passage 330, an accommodation space 340, and a connection passage 350 connected to the flow passage 330 and the accommodation space 340. The flow passage 330 may be formed inside the main body 310, and may include an inlet 332 connected to the liquid supply line 100 and through which liquid flows in, and an outlet 334 connected to the circulation line 200 and through which the liquid flows out. The accommodation space 340 may be formed inside the main body 310, and an upper portion thereof may be opened to insert the discharge unit 400, which will be described later, which discharges the liquid to the substrate, and liquid supplied from the liquid supply line 100 may be accommodated by an operation of the opening/closing valve 320. The discharge unit 400, which will be described later, may be detachably inserted into the opened upper portion of the accommodation space 340. For example, when supplying liquid to the substrate, the discharge unit 400 may be inserted into the accommodation space 340 of the main body 310, and may suck the liquid in the accommodation space 340 to discharge the liquid to the substrate. When not supplied, the discharge unit 400 may be separated from the accommodation space 340 of the main body 310. A detailed description of the discharge unit 400 will be described later. The opening/closing valve 320 may be disposed in the main body 310, and may open and close the connection passage 350. For example, the opening/closing valve 320 may be a diaphragm valve, but is not limited thereto, and valves having various embodiments may be applied as long as they may be configured to open and close the connection passage 350.

In an example embodiment, to stably supply liquid to the accommodation space 340 of the main body 310 of the liquid supply bath device 300 through the liquid supply line 100, a pressure sensor 160 and a needle valve 170 may be disposed in the liquid supply line 100. The pressure sensor 160 may be located between the pump 130 and the needle valve 170 on the liquid supply line 100, and as an example, may be located between the filter 150 and the needle valve 170 on a rear end of the pump 130 in a liquid supply direction. A pressure sensor 162 may also be additionally disposed in the liquid supply line 100 between the pump 130 and the filter 150 in a liquid supply direction. The needle valve 170 may be disposed on a front end of the liquid supply bath device 300 in a liquid supply direction of the liquid supply line 100.

As illustrated in FIG. 2, when there is no need to supply liquid to the liquid supply bath device 300, in a state in which the opening/closing valve 320 of the liquid supply bath device 300 is closed and the circulation opening/closing valve 210 is opened, the liquid may be continuously circulated to the supply tank 120 through the liquid supply line 100, the flow passage 330 of the liquid supply bath device 300, and the circulation line 200, without stagnation. Furthermore, when the liquid circulates, since the flow passage 330 and the accommodation space 340 of the liquid supply bath device 300 may be blocked from each other by the opening/closing valve 320 of the liquid supply bath device 300, the liquid may be circulated without contact with active gas or moisture in the accommodation space. Therefore, it is possible to effectively prevent uniformity deterioration of critical dimension of the substrate, or defects. Additionally, cleanliness of the liquid may be improved by being repeatedly filtered through the filter 150, when the liquid is circulated. Therefore, generation of particles may be effectively prevented, and accordingly, there is no need to perform regular dummy dispensing treatment of a conventional nozzle unit, thereby saving liquid and improving productivity. Furthermore, to efficiently capture particles during the liquid circulation process, a slow filtration method may be applied. In this case, to maintain a desired filtration rate, a flow meter 180 may be disposed on a front end of the liquid supply bath device 300, and the pump 130 may adjust a rotation speed to a desired range, based on a flow rate value of the flow meter 180.

As illustrated in FIG. 4, when it is necessary to supply liquid to the accommodation space 340 of the main body 310 of the liquid supply bath device 300, the circulation opening/closing valve 210 of the circulation line 200 may be closed, and the opening/closing valve 320 of the liquid supply bath device 300 may be opened, to supply the liquid flowing into the flow passage 330 of the liquid supply bath device 300 through the liquid supply line 100 to the accommodation space 340 through the connection passage 350. In this case, when the liquid circulates through the circulation line 200, but supply pressure of the liquid is not adjusted to an appropriate level in supplying the liquid to the liquid supply bath device 300, a problem of unstably supplying the liquid into the accommodation space 340 of the liquid supply bath device 300 may occur. To improve the problem, the supply pressure of the liquid may be adjusted through the needle valve 170, and specifically, by adjusting the supply pressure to be relatively high within a certain range, the liquid may be smoothly supplied to the accommodation space 340, even when the opening/closing valve 320 of the liquid supply bath device 300 is opened. In an example embodiment, the needle valve 170 may use a motor needle valve capable of implementing digital control. In this case, since feedback control may be performed in a desired circulation pressure while receiving a pressure value of the liquid supply line 100 on a front end of the needle valve 170 measured from the pressure sensor 160, stable feedback control may be implemented, when supplying the liquid to the accommodation space 340 of the liquid supply bath device 300. Since circulation pressure may appropriately increase, as needed, using the needle valve 170, flow control stability may also be improved.

In general, before filling the liquid supply system 1 with liquid, a flushing operation may be performed to entirely clean the liquid supply system 1 using a cleaning liquid. To effectively remove contaminants such as particles or the like therein during the flushing operation of the liquid supply system 1, a rotation speed of the pump 130 may be controlled at a high speed, and the needle valve 170 may be opened to the maximum to flow the cleaning liquid at a high speed, to entirely clean the liquid supply system 1 efficiently.

When supply of liquid to the accommodation space 340 of the liquid supply bath device 300 is completed, the opening/closing valve 320 of the liquid supply bath device 300 may be closed, and the circulation opening/closing valve 210 of the circulation line 200 may be opened. As a result, the liquid flowing into the flow passage 330 of the liquid supply bath device 300 through the liquid supply line 100 may not be supplied to the accommodation space 340 of the liquid supply bath device 300, but may be circulated to the supply tank 120 through the circulation line 200. Therefore, in the liquid supply system 1, the liquid supply bath device 300 and the discharge unit 400 may be configured in a separate structure, such that the liquid may circulate continuously, without stagnation regardless of an operation of the discharge unit 400. Therefore, stagnation of the liquid may be reduced to effectively prevent generation of particles.

Additionally, the main body 310 may further include a discharge passage 360. The discharge passage 360 may be connected to the accommodation space 340, and may discharge liquid in the accommodation space 340. To discharge the liquid in the accommodation space 340 of the liquid supply bath device 300, the liquid supply system 1 may further include a drain port 500. The drain port 500 may be connected to the discharge passage 360 of the main body 310 through a first discharge line 510. A first drain valve 520 may be disposed in the first discharge line 510, and the liquid in the accommodation space 340 of the main body 310 may be discharged to the drain port 500 through the discharge passage 360 of the main body 310 by an opening operation of the first drain valve 520. A second discharge line 530 discharging liquid inside the drain port 500 to the outside may be connected to the drain port 500, and a second drain valve 540 opening and closing a passage may be disposed in the second discharge line 530. Furthermore, to smoothly discharge liquid in the accommodation space 340 of the main body 310 to the drain port 500, the liquid supply system 1 may further include an air ejector module 600 connected to the drain port 500 and providing negative pressure inside the drain port 500. In an example embodiment, the air ejector module 600 may include an air compressor 610, an air flow line 620 of which one end is connected to the air compressor 610 and the other end communicates externally, and a regulator 630, a pressure gauge 640, an air supply opening/closing valve 650, and an air ejector 670 connected to the drain port 500 through a connection line 660 and providing negative pressure into the drain port 500, respectively arranged in the air flow line 620. A pressure measuring unit 680 measuring pressure inside the connection line 660 may be disposed on the connection line 660, and pressure of air flowing to the air ejector 670 through the regulator 630 may be adjusted to control pressure inside the drain port 500. The air ejector module 600 may be connected to the drain port 500 to perform a function, like a pump sucking gas using a Venturi effect of the air ejector 670, to smoothly discharge liquid in the accommodation space 340 of the main body 310 to the drain port 500, due to a difference in pressure between an internal space of the accommodation space 340 of the main body 310 and an internal space of the drain port 500.

Additionally, the main body 310 may further include a cleaning liquid inlet portion 370. The cleaning liquid inlet portion 370 may be connected to the accommodation space 340 of the main body 310, and may supply cleaning liquid to the accommodation space 340. To this end, the liquid supply system 1 may further include a first cleaning liquid supplier 700 connected to the cleaning liquid inlet portion 370 of the main body 310 and supplying the cleaning liquid to the accommodation space 340. The first cleaning liquid supplier 700 may include a first cleaning liquid supply line 720 connected to a cleaning liquid supply source 710 and connected to the cleaning liquid inlet portion 370 of the main body 310, and a first cleaning liquid supply valve 730 disposed on the first cleaning liquid supply line 720. The cleaning liquid inlet portion 370 may be provided as one cleaning liquid inlet portion or a plurality of cleaning liquid inlet portions. In an example embodiment, the cleaning liquid inlet portion 370 may include a first inlet portion 372 and a second inlet portion 374. The first inlet portion 372 and the second inlet portion 374 may be disposed on both side portions of the main body 310 opposite to each other with respect to the accommodation space 340 of the main body 310. In this case, the first cleaning liquid supplier 700 may branch off from an outlet end of the first cleaning liquid supply line 720, and may include a first branch line 740 and a second branch line 750, respectively connected to the cleaning liquid inlet portion 370 of the main body 310.

Furthermore, to efficiently clean the liquid supply bath device 300 when converting to a different type of liquid, the cleaning liquid inlet portion 370 may have a discharge direction discharging the cleaning liquid in a tangential direction of the accommodation space 340 of the main body 310. The accommodation space 340 of the main body 310 may have a cylindrical shape, but is not limited thereto, and may have various shapes such as an elliptical shape, etc. In an example embodiment, the first inlet portion 372 and the second inlet portion 374 may have a discharge direction generating a rotational flow while discharging the cleaning liquid in a tangential direction of the accommodation space 340 of the main body 310. The cleaning liquid flowing into the first inlet portion 372 and the second inlet portion 374 of the main body 310 through the first cleaning liquid supplier 700 may be discharged to the drain port 500 through the discharge passage 360 and the first discharge line 510, while rotating in one lateral direction in the accommodation space 340 to generate a vortex, to entirely clean efficiently an wall surface of the accommodation space 340, and as a result, remaining liquid inside the liquid supply bath device 300 may be removed efficiently. In addition, the liquid supply bath device 300 may further include a liquid level sensor 380 measuring a level of the cleaning liquid in the accommodation space 340. A balance between pressure of the air ejector 670 of the air ejector module 600 connected to the discharge passage 360 of the liquid supply bath device 300 and a flow rate of the cleaning liquid supplied from the first cleaning liquid supplier 700 may be adjusted to maintain the cleaning liquid flowing within the accommodation space 340 at a desired level, to optimize discharge efficiency of the liquid, and further improve cleaning efficiency of the liquid within the accommodation space 340.

Figure 5:
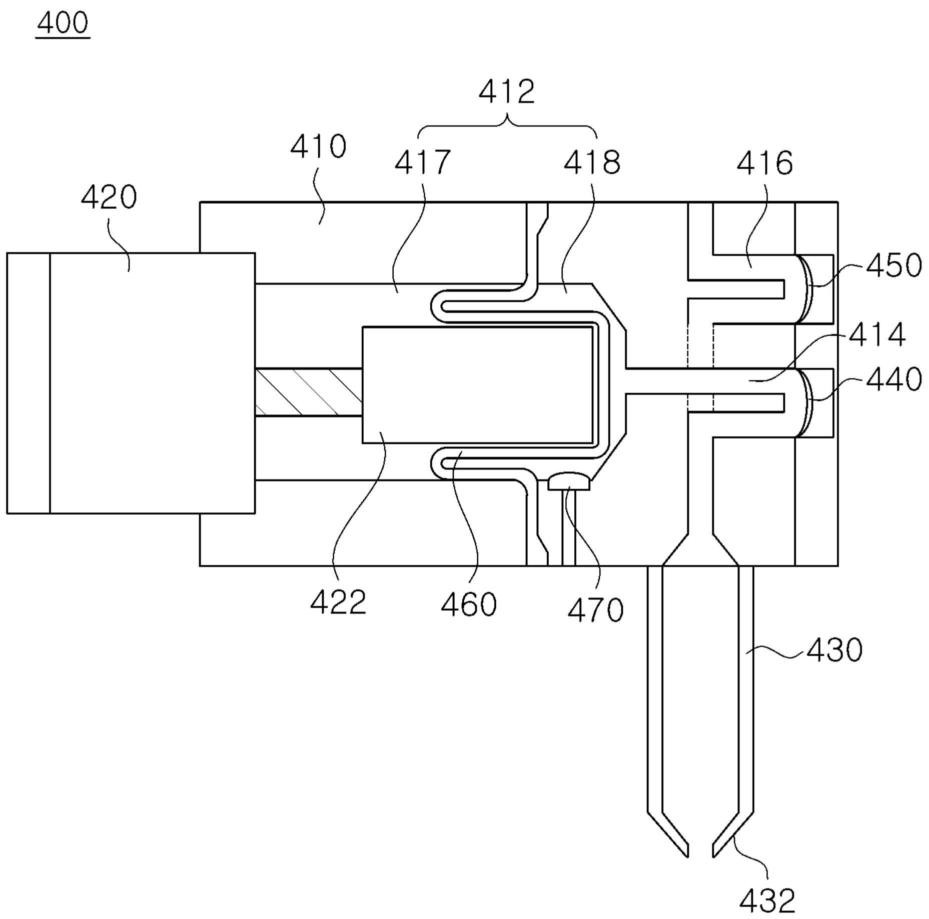
FIG. 5 is a view schematically illustrating a discharge unit according to an example embodiment.
Figure 6:
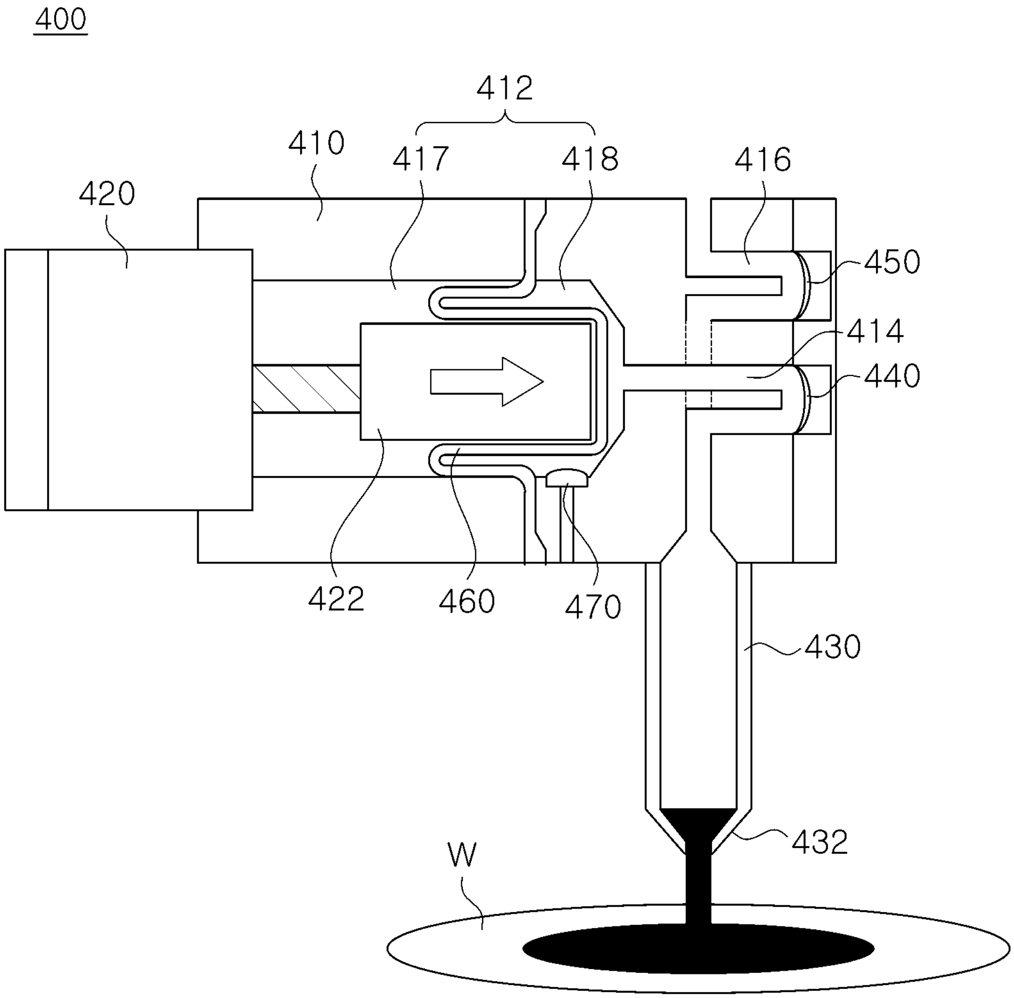
FIG. 6 is a view schematically illustrating a state in which a discharge unit discharges liquid to a substrate in a liquid supply system according to an example embodiment.

FIG. 5 is a view schematically illustrating a discharge unit according to an example embodiment, and FIG. 6 is a view schematically illustrating a state in which a discharge unit discharges liquid to a substrate in a liquid supply system 1 according to an example embodiment.

Referring to FIGS. 2 to 6, the discharge unit 400 may be detachably inserted into the accommodation space 340 of the main body 310, and may suck liquid in the accommodation space 340 of the main body 310 and discharge the liquid to a substrate W. Furthermore, although not illustrated, the liquid supply apparatus may include a moving arm (not illustrated) moving the discharge unit 400, and may move the discharge unit 400 to a desired position.

In an example embodiment, the discharge unit 400 may include a nozzle 430 detachably inserted into the accommodation space 340 of the main body 310 of the liquid supply bath device 300, and configured for sucking or discharging liquid. The discharge unit 400 may further include a cylindrical pump connected to the nozzle 430 and configured to provide negative or positive pressure into the nozzle 430 by a driver.

In an example embodiment, the discharge unit 400 may further include a pump body 410, a driving motor 420 used as the driver, a first opening/closing valve 440, and a second opening/closing valve 450.

The pump body 410 may include an internal space 412 in which a flexible diaphragm 460 is disposed, a first passage 414, and a second passage 416. The internal space 412 of the pump body 410 may be divided into a first internal space 417 and a second internal space 418 by a diaphragm 460. A moving member 422 of the drive motor 420, which will be described later, may be disposed in the first internal space 417, and one end of the first passage 414 of the pump body 410 may be connected to the second internal space 418. For example, the first passage 414 may be connected to the second internal space 418 and the nozzle 430, and the nozzle 430 may suck liquid inside the accommodation space 340 of the liquid supply bath device 300 by an operation of the driving motor 420, or may discharge liquid inside the nozzle 430. The first opening/closing valve 440 may be disposed on the pump body 410, and may block the first passage 414 of the pump body 410. The second passage 416 may be a passage utilized in cleaning the nozzle 430, and may have one end opened and the other end connected to the first passage 414. The second passage 416 may be connected to a passage portion of the first passage 414 located between the first opening/closing valve 440 and the nozzle 430. The one end of the second passage 416 may be connected to a cleaning liquid supplier (not illustrated) that supplies cleaning liquid or a gas supplier (not illustrated) that supplies gas, to selectively supply the cleaning liquid or the gas to the nozzle 430. The second opening/closing valve 450 may be disposed in the pump body 410, and may block the second passage 416 of the pump body 410. The pump body 410 may further include a pressure sensor 470 that measures pressure of the second internal space 418. According to a configuration of the discharge unit 400 having the above configuration, the nozzle 430 may suck liquid in the accommodation space 340 of the liquid supply bath device 300 through the first passage 414 or may discharge liquid inside the nozzle 430. Cleaning liquid may be supplied to the nozzle 430 through the second passage 416 and the first passage 414, and further, gas may be supplied to the nozzle 430. The gas may be utilized to dry the nozzle 430.

As illustrated in FIG. 1, in an example embodiment, the liquid supply system 1 may further include a cleaning bath device 800 to clean the nozzle 430. The cleaning bath device 800 may be disposed adjacent to the liquid supply bath device 300, but is not limited thereto, and may be disposed in various positions, as needed. The cleaning bath device 800 may be connected to the drain port 500, and may be provided with a cleaning space 830 accommodating the nozzle 430 of the discharge unit 400. In this case, an upper portion of the cleaning space 830 of the cleaning bath device 800 may be opened to allow the nozzle 430 to be inserted. The cleaning bath device 800 may be formed in a similar form to the liquid supply bath device 300, except for the flow passage 330, the connection passage 350, and the opening/closing valve 320 of the liquid supply bath device 300. For example, the cleaning bath device 800 may include the cleaning space 830 opened in an upward direction, a cleaning liquid inlet portion (not illustrated) connected to the cleaning space 830, and a discharge passage (not illustrated) connected to the cleaning space 830. The cleaning liquid inlet portion of the cleaning bath device 800 may be connected to a second cleaning liquid supplier 900, and cleaning liquid from the second cleaning liquid supplier 900 may be supplied to the cleaning space 830 of the cleaning bath device 800, to clean an external portion of the nozzle 430 inserted into the cleaning space 830. The second cleaning liquid supplier 900 may include a second cleaning liquid supply line 910 connected to a cleaning liquid supply source and connected to the cleaning liquid inlet portion of the cleaning bath device 800, and a second cleaning liquid supply valve 920 disposed in the second cleaning liquid supply line 910. A discharge passage of the cleaning bath device 800 may be connected to the drain port 500 through a third discharge line 810, and the cleaning space 830 of the cleaning bath device 800 may be connected to the drain port 500 by a third drain valve 820. The cleaning liquid may be discharged through the drain port 500. The third drain valve 820 may be disposed inside the cleaning bath device 800, and, as another example, may be disposed in the third discharge line 810. Therefore, internal and external portions of the nozzle 430 may be cleaned through the cleaning liquid supplier connected to the second passage 416 of the pump body 410 of the discharge unit 400 and the second cleaning liquid supplier 900 connected to the cleaning liquid inlet portion of the cleaning bath device 800. In accordance with aspects of the present inventive concept, since a cleaning bath device for cleaning a nozzle may be provided separately to clean separately the liquid supply bath device and the nozzle, cross-contamination between different types of liquids may be thereby prevented.

The driving motor 420 may be configured as a linear motor. The drive motor 420 may be disposed on one side of the pump body 410. The drive motor 420 may include a moving member 422 that may move in an axial direction of the drive motor 420. The moving member 422 may be accommodated in the first internal space 417 of the pump body 410, and one end thereof may be connected to the diaphragm 460. Since negative or positive pressure may be provided inside the second internal space 418, the first passage 414, and the nozzle 430, as the moving member 422 of the driving motor 420 moves in the axial direction of the driving motor 420, together with the diaphragm 460, the nozzle 430 may implement suction and discharge operations of liquid.

In this case, an embodiment including the driving motor has been described as the driver, but is not limited thereto. Various embodiments may be implemented, as long as the driver is connected to a diaphragm in the first internal space of the pump body, and moves in an axial direction to provide negative pressure or positive pressure into the nozzle.

The nozzle 430 may be disposed in a lower portion of the pump body 410, and may be connected to the other end of the first passage 414 of the pump body 410. The nozzle 430 may be detachably inserted into the accommodation space 340 of the main body 310 of the liquid supply bath device 300. Furthermore, to prevent liquid from falling from the nozzle 430 during moving the discharge unit 400 by the moving arm in a state in which the liquid is accommodated inside the nozzle 430, the moving member 422 of the driving motor 420 may move toward the drive motor 420 such that the nozzle 430 performs a suck back operation to slightly raise the liquid contained in a discharge port 432 of the nozzle 430, thereby forming an air layer in a lower portion of the liquid. When pressure required to perform the suck back operation of the nozzle 430 is too high, non-linear characteristics may appear strongly in control, and result in various defects due to control failure. To reduce the non-linear characteristics, in an example embodiment, the discharge port 432 may have a tapered shape of which cross-sectional area gradually decreases in a discharge direction of the liquid by the drive motor 420. Through the discharge port 432 of the nozzle 430 having such a tapered shape, surface force formed in the discharge port 432 during the suck back operation may be lowered, and thus negative pressure required for the suck back operation may be reduced. Therefore, the suck back operation of the nozzle 430 may be better controlled.

When supplying liquid to the substrate, in a state in which the first opening/closing valve 440 is opened and the second opening/closing valve 450 is closed, the discharge unit 400 may insert the nozzle 430 by the moving arm into the accommodation space 340 of the main body 310 of the liquid supply bath device 300, and may then generate negative pressure inside the second internal space 418, the first passage 414, and the nozzle 430 by the driving motor 420, thereby sucking the liquid inside the accommodation space 340 of the main body 310 into the nozzle 430. The discharge unit 400 including the liquid inside the nozzle 430 may move to the substrate by the moving arm, and then the driving motor 420 may press internal spaces of the second internal space 418, the first passage 414, and the nozzle 430 to discharge the liquid from the nozzle 430 to the substrate.

When cleaning the nozzle 430 of the discharge unit 400, in a state in which the first opening/closing valve 440 is closed and the second opening/closing valve 450 is opened, the nozzle 430 of the discharge unit 400 may be inserted into the cleaning space 830 of the cleaning bath device 800, and may supply the cleaning liquid from the second cleaning liquid supplier 900 into the nozzle 430 through the second passage 416 and the first passage 414 of the pump body 410, to clean an internal portion of the nozzle 430. In addition, an external portion of the nozzle 430 may be cleaned by supplying cleaning liquid from the second cleaning liquid supplier 900 connected to the cleaning liquid inlet portion of the cleaning bath device 800 to the cleaning space 830 of the cleaning bath device 800. The cleaning liquid that cleans the internal and external portions of the nozzle 430 may be discharged from the cleaning space 830 of the cleaning bath device 800 to the drain port 500 through the third discharge line 810. When cleaning of the nozzle 430 is completed, gas such as $N_2$ or the like may be supplied from the gas supplier into the nozzle 430 through the second passage 416 and the first passage 414 of the pump body 410 to dry the nozzle 430.

The liquid supply line 100, the circulation line 200, and the liquid supply bath device 300 may form a liquid supplier device 10. Although, in the above, the liquid supply system 1 has been described as an embodiment including one liquid supplier device 10 and one discharge unit 400, aspects of the present inventive concept are not limited thereto, and the liquid supply system 1 may include a plurality of liquid supplier devices 10 and one discharge unit 400 or a plurality of discharge units 400, as necessary.

Figure 7:
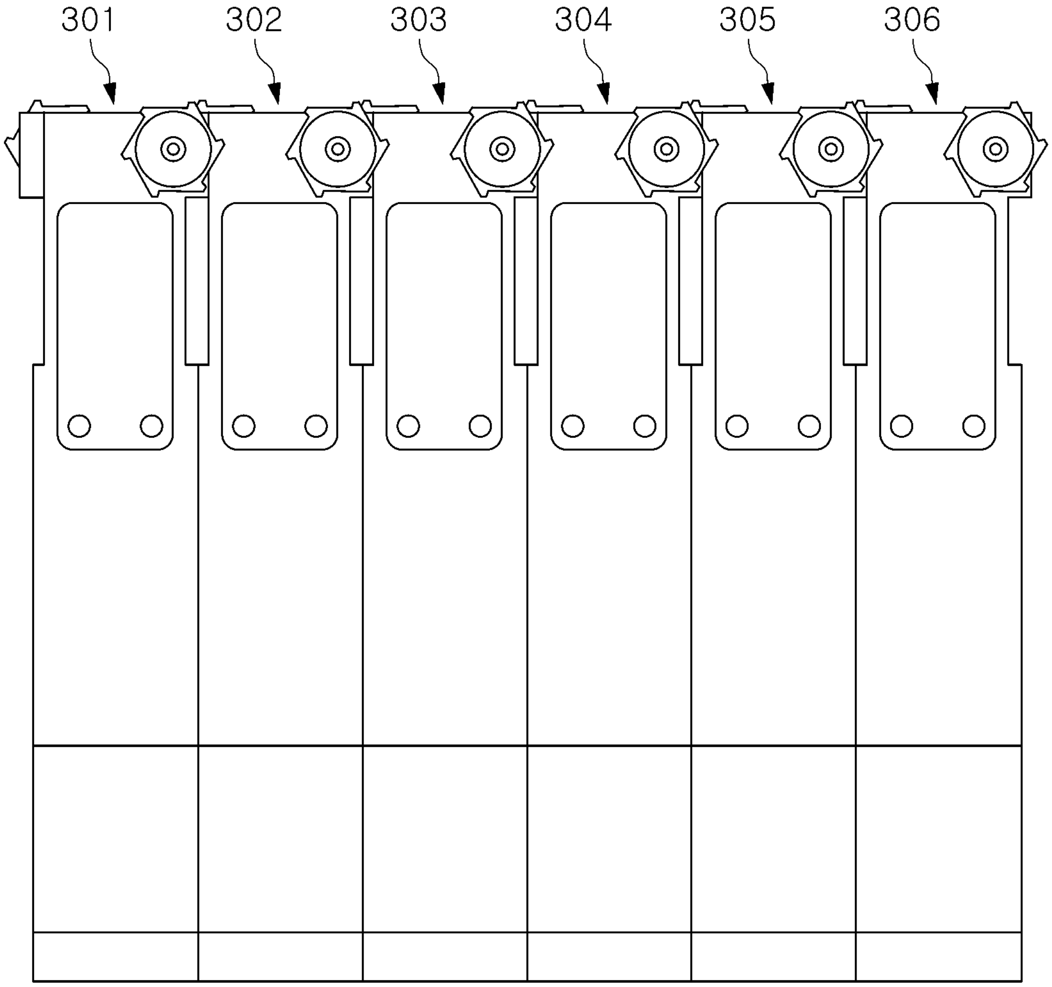
FIG. 7 is a view schematically illustrating a structure in which a plurality of liquid supply bath devices are arranged in parallel according to an example embodiment.

In an example embodiment, each liquid supply bath device 300 in the plurality of liquid supplier devices 10 may supply different types of liquid, and may be arranged adjacent to each other in parallel. For example, when the liquid supply system includes six liquid supplier devices 10, as illustrated in FIG. 7, liquid supply bath devices 301, 302, 303, 304, 305, and 306 of each of the liquid supplier devices 10 may be adjacent to each other, and a space therein may be utilized efficiently through a compact layout thereof. However, aspects of the present inventive concept are not limited thereto, and may be implemented in various configurations. As another example, a cleaning bath device 800 may be disposed between a plurality of adjacent liquid supply bath devices 300. In addition, the discharge unit 400 may be provided as one discharge unit 400 or a plurality of discharge units 400, common to the plurality of liquid supplier devices 10. In an example embodiment, a liquid supply system 1 may include one discharge unit 400, common to the plurality of liquid supplier devices 10. When the discharge unit 400 sucks liquid in the liquid supply bath device 300 of one liquid supplier device 10, among the plurality of liquid supplier devices 10, and supplies the same to the substrate W, remaining liquid supplier devices 10 may operate in a state in which the liquid continuously circulates. In this case, the discharge unit 400 may supply the liquid in the liquid supply bath device 300 of one liquid supplier device 10 to the substrate W, may then move the same to the cleaning bath device 800 to clean the nozzle 430, and then wait or move to another liquid supplier device 10. In another example embodiment, the liquid supply system 1 may include a plurality of discharge units 400, common to the plurality of liquid supplier devices 10, and may include, for example, two discharge units 400. In this case, in a critical process of discharging different liquids, continuous discharge operation to the substrate W may be implemented by utilizing the two discharge units 400, thereby improving production efficiency. According to aspects of the present inventive concept, a cleaning bath device 800 for cleaning a nozzle 430 may be provided separately to clean separately a liquid supply bath device 300 and the nozzle 430, to prevent cross-contamination between different types of liquids.

According to aspects of the present inventive concept, in a liquid supply system 1, a liquid supplier device 10 may supply liquid, as necessary, from a liquid supply bath device 300 included in the liquid supplier device 10 to a substrate W through a separate discharge unit 400. When the liquid is not supplied from the liquid supply bath device 300 to the substrate W through the discharge unit 400, the liquid supplier device 10 may circulate the liquid between the liquid supply bath device 300 and a supply tank 100 included in the liquid supplier device 10 to thereby reduce stagnation of the liquid and prevent generation of particles.

Various advantages and effects of the present inventive concept may not be limited to the above-described contents, and can be more easily understood through description of specific embodiments of the present inventive concept.

While example embodiments have been illustrated and described above, it will be apparent to those skilled in the art that modifications and variations could be made without departing from the scope of the present inventive concept as defined by the appended claims.

What is claimed is:

1. A liquid supply bath device comprising:

a main body including a flow passage having an inlet through which liquid flows in and an outlet through which the liquid flows out, an accommodation space in which the liquid is accommodated and of which an upper portion is opened to insert a discharge unit configured to discharge the liquid to a substrate, and a connection passage connected to the flow passage and the accommodation space; and an opening/closing valve disposed on the main body and configured to open and close the connection passage, wherein the main body further comprises a cleaning liquid inlet portion connected to the accommodation space and configured to supply cleaning liquid to the accommodation space.

2. The liquid supply bath device of claim 1, wherein the main body further comprises a discharge passage connected to the accommodation space and configured to discharge the liquid in the accommodation space.

3. The liquid supply bath device of claim 2, wherein the accommodation space is cylindrical, wherein the cleaning liquid inlet portion is configured to discharge cleaning liquid in a tangential direction of the accommodation space.

4. The liquid supply bath device of claim 3, wherein the cleaning liquid inlet portion comprises a first inlet portion and a second inlet portion, disposed on side portions of the main body opposite to each other with respect to the accommodation space.

5. A liquid supply apparatus comprising:

a liquid supply bath device including a main body including a flow passage having an inlet through which liquid flows in and an outlet through which the liquid flows out, an accommodation space of which an upper portion is opened and in which the liquid is accommodated, and a connection passage connected to the flow passage and the accommodation space, and an opening/closing valve disposed on the main body and configured to open and close the connection passage; and a discharge unit detachably inserted into the accommodation space, and configured to suck the liquid in the accommodation space and discharge the liquid to a substrate, wherein the main body further comprises a discharge passage connected to the accommodation space and configured to discharge the liquid in the accommodation space, and a cleaning liquid inlet portion connected to the accommodation space and configured to supply cleaning liquid to the accommodation space.

6. The liquid supply apparatus of claim 5, wherein the discharge unit comprises:

a nozzle detachably inserted into the accommodation space and configured to suck or discharge the liquid, and a cylindrical pump connected to the nozzle and configured to provide negative pressure or positive pressure into the nozzle by a driver.

7. The liquid supply apparatus of claim 6, wherein the nozzle comprises a discharge port having a tapered shape of which a cross-sectional area gradually decreases in a discharge direction of the liquid.

8. The liquid supply apparatus of claim 5, wherein the discharge unit comprises:

a pump body including an internal space in which a diaphragm is disposed and a first passage connected to a nozzle, wherein the internal space is divided into a first internal space and a second internal space connected to a first end of the first passage by the diaphragm;

a drive motor disposed on one side of the pump body, and including a moving member connected to the diaphragm in the first internal space and movable in an axial direction; and a first opening/closing valve disposed on the pump body and configured to block the first passage, wherein the nozzle is disposed below the pump body, is connected to a second end of the first passage, and is detachably inserted into the accommodation space.

9. The liquid supply apparatus of claim 8, wherein the pump body comprises a second passage having a first end exposed and a second end connected to the first passage, and configured to supply the cleaning liquid or gas to the nozzle, wherein the second passage is connected to a passage portion of the first passage located between the first opening/closing valve and the nozzle, and wherein the discharge unit further comprises a second opening/closing valve disposed on the pump body and configured to block the second passage.

10. The liquid supply apparatus of claim 5, further comprising:

a drain port connected to the discharge passage through a first discharge line on which a drain valve is disposed; and an air ejector module connected to the drain port and configured to provide negative pressure inside the drain port.

11. The liquid supply apparatus of claim 5, further comprising a first cleaning liquid supplier connected to the cleaning liquid inlet portion and configured to supply the cleaning liquid to the accommodation space.

12. The liquid supply apparatus of claim 5, wherein the cleaning liquid inlet portion comprises a first inlet portion and a second inlet portion, disposed on side portions of the main body opposite to each other with respect to the accommodation space, and wherein the first inlet portion and the second inlet portion have respective discharge directions generating a rotational flow while discharging the cleaning liquid in a tangential direction of the accommodation space.

13. A liquid supply system comprising:

a supply tank connected to a liquid supply source;

a liquid supply line connected to the supply tank and configured to transport a liquid flowing out from the supply tank;

a circulation line in which a circulation opening/closing valve is disposed and configured to circulate the liquid supplied through the liquid supply line to the supply tank;

a liquid supply bath device including a main body including a flow passage having an inlet connected to the liquid supply line and through which the liquid flows in and an outlet connected to the circulation line and through which the liquid flows out, an accommodation space of which an upper portion is opened and in which the liquid is accommodated, and a connection passage connected to the flow passage and the accommodation space, and an opening/closing valve disposed on the main body and configured to open and close the connection passage; and a discharge unit detachably inserted into the accommodation space, and configured to suck the liquid in the accommodation space and discharge the liquid to a substrate, wherein the main body further comprises a discharge passage connected to the accommodation space and configured to discharge the liquid in the accommodation space, and a cleaning liquid inlet portion connected to the accommodation space and configured to supply cleaning liquid to the accommodation space.

14. The liquid supply system of claim 13, further comprising:

a first cleaning liquid supplier connected to the cleaning liquid inlet portion and configured to supply the cleaning liquid to the accommodation space;

a drain port connected to the discharge passage through a first discharge line on which a drain valve is disposed; and an air ejector module connected to the drain port and configured to provide negative pressure inside the drain port.

15. The liquid supply system of claim 14, further comprising:

a cleaning bath device connected to the drain port, having an internal space accommodating a nozzle of the discharge unit, and configured to clean an external portion of the nozzle.

16. The liquid supply system of claim 13, wherein a pressure sensor and a needle valve are disposed in the liquid supply line, and wherein the needle valve is disposed on a front end of the liquid supply bath device in a liquid supply direction of the liquid supply line.

17. The liquid supply system of claim 13, wherein the discharge unit comprises:

a pump body including an internal space in which a diaphragm is disposed, and a first passage and a second passage, connected to a nozzle, wherein the internal space is divided into a first internal space and a second internal space connected to a first end of the first passage by the diaphragm, a first end of the second passage is exposed, a second end of the second passage is connected to the first passage, and the cleaning liquid or gas is supplied to the nozzle;

a drive motor disposed on one side of the pump body, and including a moving member connected to the diaphragm in the first internal space and movable in an axial direction;

a first opening/closing valve disposed on the pump body and configured to block the first passage; and a second opening/closing valve disposed on the pump body and configured to block the second passage, wherein the nozzle is disposed below the pump body, is connected to a second end of the first passage, and is detachably inserted into the accommodation space.

18. The liquid supply system of claim 13, wherein the liquid supply line, the circulation line, and the liquid supply bath device form a liquid supplier device, wherein the liquid supplier device is provided as a plurality of liquid supplier devices, and wherein the discharge unit is provided as one discharge unit or a plurality of discharge units, shared with the plurality of liquid supplier devices.

* * * * *